United States Patent [19]

Akiyama et al.

[11] Patent Number: 4,716,021

[45] Date of Patent: Dec. 29, 1987

[54] HEAT TREATMENT APPARATUS FOR POLYOLEFIN RESIN PARTICLES

[75] Inventors: Hiroyuki Akiyama, Hiratsuka; Susumu Izawa, Utsunomiya; Shigeru Okabe, Imaichi; Toru Yamaguchi, Utsunomiya, all of Japan

[73] Assignee: Japan Styrene Paper Corp., Tokyo, Japan

[21] Appl. No.: 883,655

[22] Filed: Jul. 9, 1986

[30] Foreign Application Priority Data

Jul. 17, 1985 [JP] Japan ................................. 60-157493

[51] Int. Cl.$^4$ ............................................. B01F 7/06
[52] U.S. Cl. ................................... 422/135; 422/226; 366/315; 366/317
[58] Field of Search ................. 422/135, 138, 226; 366/215, 217, 265, 279, 315, 317; 162/243, 57

[56] References Cited

U.S. PATENT DOCUMENTS

| | | | |
|---|---|---|---|
| 1,613,391 | 1/1927 | Greene | 366/317 |
| 2,616,340 | 11/1952 | Knoll | 366/315 |
| 3,749,555 | 7/1973 | Beckman et al. | 422/135 |
| 3,787,284 | 1/1974 | Richter | 162/243 |
| 4,050,901 | 9/1977 | Pfeiffer et al. | 422/138 |
| 4,125,697 | 11/1978 | Pettelkau et al. | 422/135 |
| 4,298,576 | 11/1981 | Thyret et al. | 422/135 |

Primary Examiner—S. Leon Bashore
Assistant Examiner—Lori-Ann Cody
Attorney, Agent, or Firm—Sherman and Shalloway

[57] ABSTRACT

An apparatus is provided for the heat treatment of polyolefin resin particles. The apparatus is equipped with an autoclave in which the particles are heated and agitated in the presence of an aqueous medium and dispersing agent. The autoclave has a tilted bottom wall portion, over which an impeller, preferably, a turbine-type impeller is provided.

6 Claims, 7 Drawing Figures

HEAT TREATMENT APPARATUS FOR POLYOLEFIN RESIN PARTICLES

BACKGROUND OF THE INVENTION (1) Field of the Invention

This invention relates to a heat treatment apparatus for polyolefin resin particles. Specifically, the present invention relates to an apparatus for heating and agitating polyolefin resin particles in the presence of an aqueous medium and dispersing agent in an autoclave so as to subject the resin particles to a heat treatment or an apparatus for heating and agitating polyolefin resin particles in the presence of an aqueous medium, dispersing agent and crosslinking agent in an autoclave to subject the resin particles to a heat treatment and hence to crosslinking, in which apparatus an impeller is provided over a tilted bottom wall portion of the autoclave.

(2) Description of the Prior Art

As conventional heat treatment apparatus for polyolefin resin particles, there have been employed apparatus in which an impeller of a desired shape is suspended in an autoclave so as to agitate and heat resin particles together with a dispersing agent and the like in the autoclave, whereby the resin particles are subjected to a heat treatment. Apparatus equipped with conventional impellers suspended in autoclaves are show, by way of example, in FIGS. 4, 5, 6 and 7.

When a heat treatment is applied to polyolefin resin particles, it is preferable that resulting resin particles or crosslinked resin particles are obtained with spherical shapes. The formation of these resin particles into spherical shapes has been the subject of a great deal of work. When the formation of particles of the resin into spherical shapes is desired it is generally required to lower the viscosity of the resin. For this purpose, it is necessary to heat the resin to its melting point or higher. When spherical particles of crosslinked polyolefin resin are produced, it is also necessary to conduct their production at an elevated temperature (for example, the melting point of the resin or higher) so as to shorten the time required for its crosslinking reaction.

However, whenever agitation of polyolefin resin particles was attempted at such a high temperature in an aqueous medium by means of an apparatus of the above-mentioned type, it was impossible to avoid fusion-cohesion and agglomeration of the particles so that spherical particles were difficult to obtain.

SUMMARY OF THE INVENTION

With the foregoing drawbacks of the prior art in view, the present invention has as its object the provision of a heat treatment apparatus which can provide a number of spherical particles in a short period of time through a single-step operation by agitating particles of a polyolefin resin at an elevated temperature in an aqueous medium.

The present inventors have carried out extensive research in order to achieve the above-described object. As a result, it has been found that a heat treatment apparatus equipped with an impeller over a tilted bottom wall portion of an autoclave can provide a number of spherical particles in a single-step operation without inducing fusion-cohesion and agglomeration of polyolefin resin particles upon their agitation at an elevated temperature in an aqueous medium, thus providing an economically-advantageous and efficient heat treatment apparatus for polyolefin resin particles. The impeller is provided over the tilted bottom wall portion of the autoclave such that the rotation of the impeller has an axis of rotation which is tilted or inclined with respect to the vertical of the autoclave. Based on this finding, the present invention has been brought to completion.

In one aspect of this invention, there is thus provided a heat treatment apparatus for polyolefin resin particles, said apparatus being equipped with an autoclave in which the particles are heated and agitated in the presence of an aqueous medium and dispersing agent, characterized in that said autoclave has a tilted bottom wall portion and an impeller is provided over the tilted bottom wall portion.

Owing to the provision of the impeller over the tilted bottom wall portion of the autoclave, the stream of the particles, aqueous medium and dispersing agent become irregular in its entirety. Hence, both horizontal and vertical streams occur in disorder to develop the so-called turbulence. The heat treatment apparatus of this invention has an advantageous effect that upon heat treatment of water-floaty particles of a polyolefin resin, the particles are prevented from gathering together above the water surface and undergoing fusion-cohesion and agglomeration The heat treatment apparatus of this invention has brought about various other advantageous effects. For example, the collision between the impeller and particles is reduced since the impeller is provided over the tilted bottom wall portion of the autoclave. A number of spherical particles can be obtained in a short period of time by a single-step operation, because the above-described development of turbulence is effective in eliminating such a conventional problem that flattened particles and/or elongated fiber-like pieces are formed due to collision of particles against the impeller.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENT

The term "polyolefin resin" as used herein means, for example, low-density polyethylene, medium-high density polyethylene, polypropylene, ethylenepropylene copolymers, ethylene-vinyl acetate copolymers and so on. Since particles of these resins are floaty on water, the resin particles tend to gather together on the water surface and are hence susceptible to fusion-cohesion and agglomeration when their mixing is performed in an aqueous medium by a conventional agitation method. In view of this conventional problem, an agitator (1) is provided over a tilted bottom wall portion (3) of an autoclave (2) in the present invention. This manner of agitator provision renders the stream of the aqueous mixture irregular throughout the interior of the apparatus. As a result, both horizontal and vertical streams occur in disorder and the so-called turbulence is developed, whereby the polyolefin resin particles are prevented from gathering together above the water surface and undergoing fusion cohesion and agglomeration.

In the present invention, the preferable diameter-to-depth ratio of the autoclave may range from 2/1 to 1/5 with 1/1.5 to 1/3.5 being more desirable. If an autoclave having a diameter-to-depth ratio greater than 2/1 is used, it is difficult to develop sufficient turbulence because the diameter is excessively large compared with the depth. More resin particles are hence allowed to float on the liquid surface near the wall of the autoclave, thereby causing the resin particles to undergo fusion cohesion and agglomeration. If excessive agitation is applied in order to develop sufficient turbulence, there is a possible danger that the liquid surface becomes very choppy and the resin particles undergo fusion cohesion and agglomeration.

If the diameter-to-depth ratio of the autoclave is smaller than 1/5, in other words, the depth is greater compared with the diameter, the flow velocity of the liquid is lowered in an upper layer of the liquid even if the revolution speed of the impeller is increased. There is hence a danger that resin particles are allowed to float and undergo fusion cohesion and agglomeration on the surface of the liquid.

Figure 1:
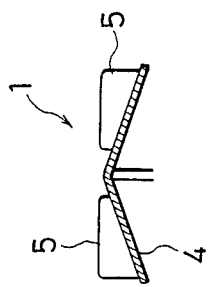
FIG. 1 is a vertical cross-section of a heat treatment apparatus according to one embodiment of this invention.
Figures 2, 3:
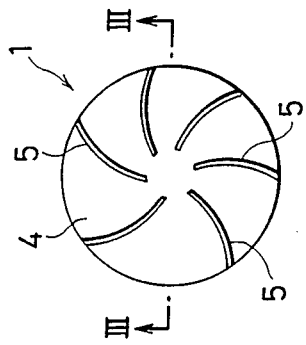
FIG. 2 is a plane view illustrating a turbine-type impeller by way of example.
FIG. 3 is a schematic vertical cross-section taken along line III—III of FIG. 2.

As the impeller in the present invention, a turbine-type impeller is desirable. Among various turbine-type impellers, the turbine-type impeller (1) composed of a dome or umbrella-shaped disk (4) and vanes (5),(5), ... provided radially on the face or convex side of the disk as depicted in FIG. 2 and FIG. 3 is most preferable. The number of the vanes (5) is at least 2 with 4–10 vanes being preferred. Each vane (5) may have a straight shape or as an alternative, such a curved shape as depicted in FIG. 2.

The diameter ratio of the turbine-type impeller to the autoclave may preferably range from 1/10 to ½, with 1/7 to ¼ being more preferred.

If the above ratio is smaller than 1/10, the revolution speed of the impeller has to be increased significantly in order to develop sufficient turbulence. This results in excessive turbulence in the vicinity of the impeller, whereby the resin particles collide against the impeller. As a result, deformed particles can only be obtained in some instances.

If the above ratio exceeds ½, sufficient agitation can be achieved even at a low revolution speed but turbulence is difficult to develop. As a result, resin particles tend to gather above the water surface so that formation of spherical polyolefin resin particles encounters difficulties.

Further, the ratio of the maximum height of the vanes of the turbine-type impeller to the diameter of the turbine-type impeller may preferably range from 1/1 to 1/10 with ½ to ⅛ being more preferred. If this ratio exceeds 1/1, vigorous agitation occurs near the impeller and resin particles are hence rendered more susceptible to deformation even when the impeller is rotated at a low speed. On the other hand, any ratios smaller than 1/10 require an increase in the revolution speed in order to develop turbulence. Accordingly, resin particles have more chance to collide against vanes of the impeller and more deformed particles tend to result.

Upon application of the apparatus according to this invention, an aqueous medium, dispersing agent and resin particles are charged in the autoclave. After heating and agitating the contents, they are cooled to obtain heat-treated resin particles.

As the aqueous medium, water is most preferable for its lowest price. Water may be used in an amount of 100–1000 parts by weight based on 100 parts by weight of resin particles.

It is possible to use, as the above-described dispersing agent, aluminum oxide, zinc carbonate, magnesium carbonate, calcium carbonate, calcium phosphate or the like. The dispersing agent may be used in an amount of 0.1 part by weight based on 100 parts by weight of resin particles.

The apparatus of this invention can also produce crosslinked spherical particles by using a crosslinking agent along with the above-described aqueous medium, dispersing agent and resin particles. As the crosslinking agent, dicumyl peroxide, 2,5-dimethyl-2,5-dihexane (tert-butyl peroxide), di-tert-butyl perphthalate, tert-butyl hydroperoxide or the like may be employed. It may be used in an amount of 0.01 part by weight or more based on 100 parts by weight of resin particles.

When obtaining resin particles or crosslinked resin particles by means of the apparatus of this invention, the heating temperature may preferably range from 130° C. to 170° C. On the other hand, the heating time may be chosen from 5 minutes to 8 hours or so.

When resin particles are subjected to a heat treatment or to a heat and crosslinking treatment by means of the apparatus of this invention, a number of spherical particles can be obtained in a short period of time by a single-step operation. A foaming agent may also be charged in the autoclave upon effecting the above-described heat treatment or heat and crosslinking treatment of the resin particles, so that prefoamed particles can be obtained.

The present invention will hereinafter be described in further detail by the following Examples and Comparative Examples.

EXAMPLES 1–8

In each of autoclaves equipped with impellers which had the same shape as that depicted in FIG. 2 and had the corresponding dimensions shown in Table 1-1, particles of an ethylene-propylene random copolymer (melt flow index: 8.2 g/10 minutes; in the form of pellets having a density of 0.90 g/cm$^3$, average diameter of 1.05 mm and average length of 3.0 mm) and water were charged in their corresponding amounts shown in Table 1-2. After a dispersing agent of the corresponding type and amount shown in Table 1-2 was added to the autoclave while agitating the contents of the autoclave, the autoclave was sealed. The contents of the autoclave were then maintained at 165° C. for 1 hour with stirring. The autoclave was thereafter cooled and its contents were discharged. Properties of the resultant resin particles are shown in Table 1-2.

COMPARATIVE EXAMPLE 1

Figure 4:
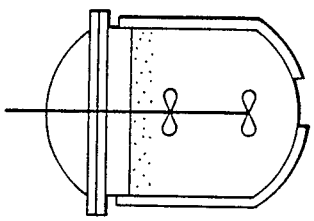
FIG. 4 through FIG. 7 are schematic vertical cross-sections showing conventional apparatus.

Using an autoclave having the dimensions shown in Table 1-1 and equipped with the impeller depicted in FIG. 4, resin particles were obtained under the same conditions as in Example 6. Properties of the resultant resin particles are shown in Table 1-2.

COMPARATIVE EXAMPLE 2

Figure 5:
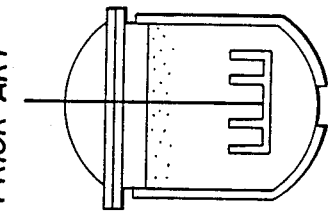

Using an autoclave having the dimensions shown in Table 1-1 and equipped with the impeller depicted in FIG. 5, resin particles were obtained under the same conditions as in Example 6. Properties of the resultant resin particles are shown in Table 1-2.

COMPARATIVE EXAMPLE 3

Figure 6:
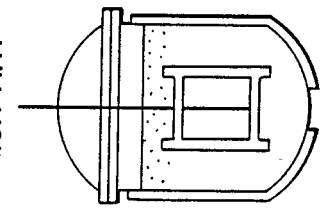

Using an autoclave having the dimensions shown in Table 1-1 and equipped with the impeller depicted in FIG. 6, resin particles were obtained under the same conditions as in Example 6. Properties of the resultant resin particles are shown in Table 1-2.

COMPARATIVE EXAMPLE 4

Figure 7:
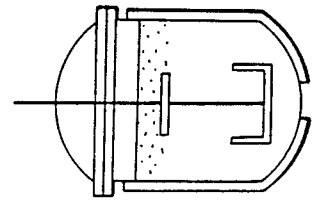

Using an autoclave having the dimensions shown in Table 1-1 and equipped with the impeller depicted in FIG. 7, resin particles were obtained under the same conditions as in Example 6. Properties of the resultant resin particles are shown in Table 1-2.

the contents were heated to 160° C. at which they were maintained with agitation for 1 hour. The autoclave was thereafter cooled and its contents were discharged. Properties of the resultant resin particles are shown in Table 2-2.

COMPARATIVE EXAMPLE 5

Using an autoclave having the dimensions shown in Table 2-1 and equipped with the impeller depicted in FIG. 4, resin particles were obtained under the same conditions as in Example 14. Properties of the resultant resin particles are shown in Table 2-2.

COMPARATIVE EXAMPLE 6

Using an autoclave having the dimensions shown in Table 2-1 and equipped with the impeller depicted in

TABLE 1-1

| | Autoclave volume ($m^3$) | Autoclave diameter: $L_1$ (cm) | Autoclave depth: $H_1$ (cm) | $L_1/H_1$ | Diameter of turbine-type impeller: $L_2$ (cm) | $L_2/L_1$ | Max. vane height: $H_2$ (cm) | $H_2/L_2$ |
|---|---|---|---|---|---|---|---|---|
| Example | | | | | | | | |
| 1 | 0.005 | 16.5 | 30 | 1/1.8 | 6.6 | 1/2.5 | 1.8 | 1/3.7 |
| 2 | 0.005 | 16.5 | 30 | 1/1.8 | 3.3 | 1/5 | 2.0 | 1/1.7 |
| 3 | 0.005 | 16.5 | 30 | 1/1.8 | 2.5 | 1/6.6 | 2.3 | 1/1.1 |
| 4 | 0.005 | 24 | 12 | 2/1 | 8 | 1/3 | 2.0 | 1/4 |
| 5 | 0.005 | 11 | 53 | 1/4.8 | 4 | 1/2.8 | 2.0 | 1/2 |
| 6 | 0.4 | 60 | 163 | 1/2.7 | 26 | 1/2.3 | 8.0 | 1/3.3 |
| 7 | 12 | 220 | 410 | 1/1.9 | 59 | 1/3.7 | 9.0 | 1/6.5 |
| 8 | 12 | 220 | 410 | 1/1.9 | 59 | 1/3.7 | 9.0 | 1/6.5 |
| Comp. Ex. | | | | | | | | |
| 1 | 0.4 | 60 | 163 | 1/2.7 | An autoclave with the impeller of FIG. 4 was used. | | | |
| 2 | 0.4 | 60 | 163 | 1/2.7 | An autoclave with the impeller of FIG. 5 was used. | | | |
| 3 | 0.4 | 60 | 163 | 1/2.7 | An autoclave with the impeller of FIG. 6 was used. | | | |
| 4 | 0.4 | 60 | 163 | 1/2.7 | An autoclave with the impeller of FIG. 7 was used. | | | |

TABLE 1-2

| | Proportioning conditions | | | | Results | | |
|---|---|---|---|---|---|---|---|
| | Ethylene-propylene random copolymer (parts) | Water (parts) | Dispersing agent Kind | Amount (parts) | Fusion cohesion | Percent (%) of flattened particles | Percent (%) of spherical particles |
| Example | | | | | | | |
| 1 | 100 | 300 | Aluminum oxide | 1.5 | Not occurred | $\leq 2$ | $\geq 98$ |
| 2 | 100 | 300 | " | 1.5 | Not occurred | $\leq 2$ | $\geq 98$ |
| 3 | 100 | 300 | " | 1.5 | Not occurred | $\leq 2$ | $\geq 98$ |
| 4 | 100 | 300 | " | 1.5 | Not occurred | $\leq 2$ | $\geq 98$ |
| 5 | 100 | 300 | " | 1.5 | Not occurred | $\leq 2$ | $\geq 98$ |
| 6 | 100 | 300 | " | 1.5 | Not occurred | $\leq 2$ | $\geq 98$ |
| 7 | 100 | 300 | " | 1.5 | Not occurred | $\leq 2$ | $\geq 98$ |
| 8 | 100 | 300 | Aluminum hydroxide | 1.5 | Not occurred | $\leq 2$ | $\geq 98$ |
| Comp. Ex. | | | | | | | |
| 1 | 100 | 300 | Aluminum oxide | 1.5 | Occurred | $\leq 2$ | $\geq 98$ |
| 2 | 100 | 300 | " | 1.5 | Occurred | Not usable due to fusion cohesion of particles | |
| 3 | 100 | 300 | " | 1.5 | Occurred | | |
| 4 | 100 | 300 | " | 1.5 | Occurred | | |

Percent (%) of flattened particles: One hundred particles were taken out from the resultant particles and flattened particles were counted. This procedure was repeated three times and the average number was then calculated. [see also Table 2-2 (Cont'd).]
Percent (%) of spherical particles: One hundred particles were taken out from the resultant particles and spherical particles were counted. This procedure was repeated three times and the average number was then calculated. [see also Table 2-2 (Cont'd).]

EXAMPLES 9–18

In each of autoclaves equipped with impellers which had the same shape as that depicted in FIG. 2 and had the corresponding dimensions shown in Table 2-1, polyolefin resin particles of the corresponding type and mount shown in Table 2-2 and water in the corresponding amount given in Table 2-2 were charged, followed by addition with stirring of a crosslinking agent of the corresponding type and amount shown in Table 2-2 and a dispersing agent of the corresponding type and amount given in Table 1-2. The autoclave was then sealed. After agitating the contents at 100° C. for 1 hour, FIG. 5, resin particles were obtained under the same conditions as in Example 14. Properties of the resultant resin particles are shown in Table 2-2.

COMPARATIVE EXAMPLE 7

Using an autoclave having the dimensions shown in Table 2-1 and equipped with the impeller depicted in FIG. 6, resin particles were obtained under the same conditions as in Example 14. Properties of the resultant resin particles are shown in Table 2-2.

COMPARATIVE EXAMPLE 8

Using an autoclave having the dimensions shown in Table 2-1 and equipped with the impeller depicted in FIG. 7, resin particles were obtained under the same conditions as in Example 14. Properties of the resultant resin particles are shown in Table 2-2.

TABLE 2-1

| | Autoclave volume ($m^3$) | Autoclave diameter: $L_1$ (cm) | Autoclave depth: $H_1$ (cm) | $L_1/H_1$ | Diameter of turbine-type impeller: $L_2$ (cm) | $L_2/L_1$ | Max. vane height: $H_2$ (cm) | $H_2/L_2$ |
|---|---|---|---|---|---|---|---|---|
| Example | | | | | | | | |
| 9 | 0.005 | 16.5 | 30 | 1/1.8 | 6.6 | 1/2.5 | 1.8 | 1/3.7 |
| 10 | 0.005 | 16.5 | 30 | 1/1.8 | 6.6 | 1/2.5 | 1.8 | 1/3.7 |
| 11 | 0.005 | 16.5 | 30 | 1/1.8 | 6.6 | 1/2.5 | 1.8 | 1/3.7 |
| 12 | 0.005 | 24 | 12 | 2.0/1 | 8 | 1/3.0 | 2.0 | 1/4 |
| 13 | 0.005 | 11 | 53 | 1/4.8 | 4 | 1/2.8 | 2.0 | 1/2 |
| 14 | 0.4 | 60 | 163 | 1/2.7 | 26 | 1/2.3 | 6.0 | 1/4.3 |
| 15 | 0.4 | 60 | 163 | 1/2.7 | 20 | 1/3.0 | 8.0 | 1/2.5 |
| 16 | 0.4 | 60 | 163 | 1/2.7 | 20 | 1/4.0 | 10.0 | 1/2 |
| 17 | 0.4 | 60 | 163 | 1/2.7 | 10 | 1/6.0 | 7.0 | 1/1.4 |
| 18 | 12 | 220 | 410 | 1/1.9 | 59 | 1/3.7 | 9.0 | 1/6.5 |
| Comp. Ex. | | | | | | | | |
| 5 | 0.4 | 60 | 163 | 1/2.7 | An autoclave with the impeller of FIG. 4 was used. | | | |
| 6 | 0.4 | 60 | 163 | 1/2.7 | An autoclave with the impeller of FIG. 5 was used. | | | |
| 7 | 0.4 | 60 | 163 | 1/2.7 | An autoclave with the impeller of FIG. 6 was used. | | | |
| 8 | 0.4 | 60 | 163 | 1/2.7 | An autoclave with the impeller of FIG. 7 was used. | | | |

TABLE 2-2

| | Proportioning conditions | | | | | |
|---|---|---|---|---|---|---|
| | Polyolefin resin | | Water | Crosslinking agent | | Dispersing agent | |
| | Kind | Amount (pts) | (pts) | Kind | Amount (pts) | Kind | Amount (pts) |
| Example | | | | | | | |
| 9 | High-density PE | 100 | 300 | Dicumyl peroxide | 0.32 | Aluminum oxide | 1.5 |
| 10 | Linear low-density PE | 100 | 300 | " | 0.40 | Aluminum hydroxide | 1.5 |
| 11 | Low-density PE | 100 | 300 | " | 0.45 | Basic magnesium carbonate | 1.5 |
| 12 | " | 100 | 300 | " | 0.45 | Basic magnesium carbonate | 1.5 |
| 13 | " | 100 | 300 | " | 0.45 | Basic magnesium carbonate | 1.5 |
| 14 | " | 100 | 300 | " | 0.45 | Basic magnesium carbonate | 1.5 |
| 15 | " | 100 | 300 | " | 0.45 | Basic magnesium carbonate | 1.5 |
| 16 | " | 100 | 300 | " | 0.45 | Basic magnesium carbonate | 1.5 |
| 17 | " | 100 | 300 | " | 0.45 | Basic magnesium carbonate | 1.5 |
| 18 | " | 100 | 300 | " | 0.45 | Basic magnesium carbonate | 1.5 |
| Comp. Ex. | | | | | | | |
| 5 | " | 100 | 300 | " | 0.45 | Basic magnesium carbonate | 1.5 |
| 6 | " | 100 | 300 | " | 0.45 | Basic magnesium carbonate | 1.5 |
| 7 | " | 100 | 300 | " | 0.45 | Basic magnesium carbonate | 1.5 |
| 8 | " | 100 | 300 | " | 0.45 | Basic magnesium carbonate | 1.5 |

| | Results | | | |
|---|---|---|---|---|
| | Fusion cohesion | Percent (%) of flattened particles | Percent (%) of spherical particles | Degree of gelation (%) |
| Example | | | | |
| 9 | Not occurred | $\leq 2$ | $\geq 98$ | 36 |
| 10 | Not occurred | $\leq 2$ | $\geq 98$ | 30 |
| 11 | Not occurred | $\leq 2$ | $\geq 98$ | 55 |
| 12 | Not occurred | $\leq 2$ | $\geq 98$ | 55 |
| 13 | Not occurred | $\leq 2$ | $\geq 98$ | 53 |
| 14 | Not occurred | $\leq 2$ | $\geq 98$ | 55 |
| 15 | Not occurred | $\leq 2$ | $\geq 98$ | 54 |
| 16 | Not occurred | $\leq 2$ | $\geq 98$ | 55 |
| 17 | Not occurred | $\leq 2$ | $\geq 98$ | 56 |
| 18 | Not occurred | $\leq 2$ | $\geq 98$ | 52 |
| Comp. Ex. | | | | |
| 5 | Occurred | Not usable due to fusion cohesion of particles | | |
| 6 | Occurred | | | |
| 7 | Occurred | | | |

TABLE 2-2-continued

| 8 | Occurred |
|---|---|

Having now fully described the invention, it will be apparent to one of ordinary skill in the art that many modifications and changes can be made thereto without departing from the spirit or scope of the invention as set forth herein.

We claim:

1. An apparatus for the heat treatment of polyolefin resin particles comprising an autoclave having a tilted bottom wall portion and a turbine-type impeller provided over said tilted bottom wall portion such that the rotation of the impeller has an axis of rotation which is inclined with respect to the vertical of the autoclave, said impeller comprising a dome or umbrella-shaped disk and vanes arranged radially on the face or convex side of said disk.

2. The apparatus of claim 1 wherein the autoclave has a diameter-to-depth ratio of 2/1 to 1/5.

3. The apparatus of claim 2 wherein the diameter ratio of the impeller to the autoclave ranges from 1/10 to ½.

4. The apparatus of claim 3, wherein the ratio of the maximum height of the vanes of the impeller to the diameter of the impeller ranges from 1/1 to 1/10.

5. The apparatus of claim 1 wherein the diameter ratio of the impeller to the autoclave ranges from 1/10 to ½.

6. The apparatus of claim 5, wherein the ratio of the maximum height of the vanes of the impeller to the diameter of the impeller ranges from 1/1 to 1/10.

* * * * *